United States Patent [19]
Macaluso et al.

[11] Patent Number: 6,160,896
[45] Date of Patent: Dec. 12, 2000

[54] VARIABLE FREQUENCY RESPONSE MICROPHONE PORTING SYSTEM

[75] Inventors: Michael J. Macaluso, Sunrise; Michael W. Petersen, Coral Springs, both of Fla.

[73] Assignee: Motorola, Inc., Schaumburg, Ill.

[21] Appl. No.: 09/075,140

[22] Filed: May 8, 1998

[51] Int. Cl.$^7$ ............................................. A04R 25/00
[52] U.S. Cl. ............................................. 381/386; 455/350
[58] Field of Search ............................ 381/189, 391, 381/386, 371, 370, 373, FOR 147, FOR 148; 455/350, 351, 90, 575

[56] References Cited

U.S. PATENT DOCUMENTS

| | | |
|---|---|---|
| 2,518,805 | 8/1950 | Massa . |
| 3,701,016 | 10/1972 | Bennett et al. . |
| 3,763,434 | 10/1973 | Blesch et al. . |
| 3,876,843 | 4/1975 | Moen . |
| 4,012,605 | 3/1977 | Jasinski ................................... 179/180 |
| 4,027,116 | 5/1977 | Nakamura . |
| 4,038,502 | 7/1977 | Ambruoso, Sr. et al. .............. 179/179 |
| 4,257,121 | 3/1981 | Henderson et al. . |
| 4,535,475 | 8/1985 | Ward . |
| 5,555,554 | 9/1996 | Hofer et al. . |
| 5,832,388 | 11/1998 | Williams et al. . |

*Primary Examiner*—Curtis A. Kuntz
*Assistant Examiner*—P Dabney
*Attorney, Agent, or Firm*—Barbara R. Doutre

[57] ABSTRACT

A transducer porting assembly (100, 200, 300) includes a transducer (102) mounted within a housing (502) and an adjustable iris diaphragm (104) formed within the housing and aligned with the transducer. A selectable control (506) allows the audio response of the transducer (102) to be controlled by a user so as to accommodate various acoustic environments (508).

10 Claims, 3 Drawing Sheets

VARIABLE FREQUENCY RESPONSE MICROPHONE PORTING SYSTEM

TECHNICAL FIELD

This invention relates in general to transducers and more specifically to the optimization of audio responses with respect thereto.

BACKGROUND

Audio shaping and acoustic optimization are important aspects to be considered in the design of electronic communications devices. Unfortunately what is an optimum design for one acoustic environment is not necessarily an optimized design for another acoustic environment. Typically, a communications product, such as a hand-held radio, is pre-defined for one set of acoustic conditions to suit a particular customer's primary needs. Unfortunately, from a manufacturing standpoint, this results in different assembly kits for different customers depending on where their primary product use is going to be. There are also software options but these are generally set once and are not user accessible.

Because today's portable hand-held radios are used in so many different environments, designing for optimal acoustic performance for one set of acoustic conditions may not completely address a customer's needs. For example, a portable radio may be used in a factory setting, then moved to an automobile, and then taken into a quiet indoor office or home. Each of these settings presents a different acoustic environment presenting different design challenges, such as machine noise, wind noise, and general background noise.

Accordingly, it would be beneficial to have an adaptable acoustic optimization apparatus for a communication device. A selectable control feature which allowed either user or factory acoustic optimization would be further desirable.

DETAILED DESCRIPTION OF THE PREFERRED EMBODIMENT

Figure 1:
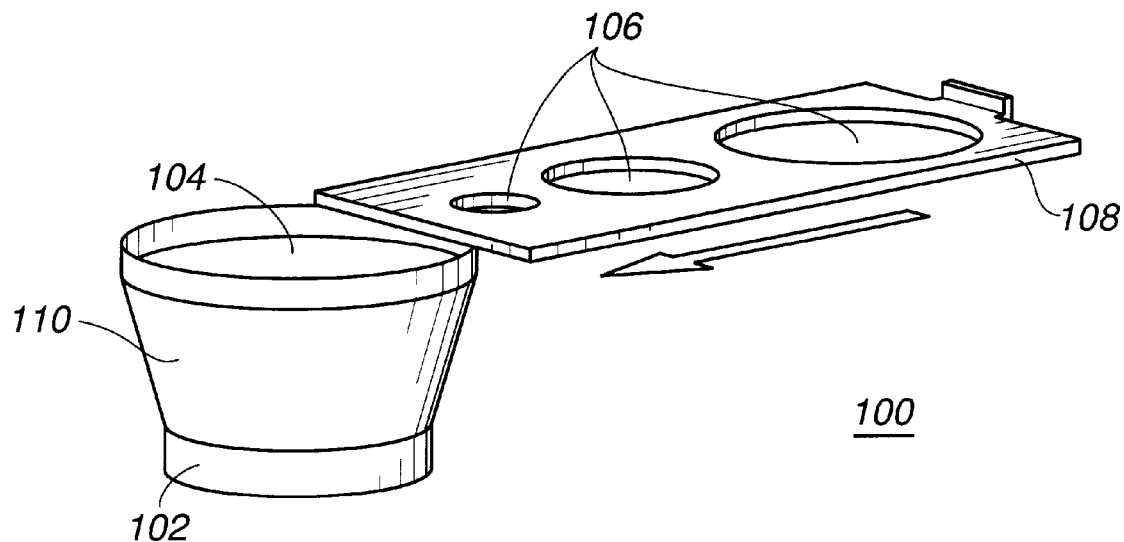
FIG. 1 is a transducer porting assembly in accordance with a first embodiment of the invention.

While the specification concludes with claims defining the features of the invention that are regarded as novel, it is believed that the invention will be better understood from a consideration of the following description in conjunction with the drawing figures, in which like reference numerals are carried forward.

An audio porting assembly to be described herein is applicable to microphone and/or speaker applications to provide selectable audio shaping. As regards this application the microphone and speaker will be referred to generally as a transducer. Briefly, in accordance with the present invention, acoustic optimization is achieved by providing a transducer porting assembly which includes an adjustable iris diaphragm aligned with the transducer. Further in accordance with the present invention, the adjustable iris diaphragm provides a plurality of selectable aperture sizes for shaping the audio response of the transducer. Various embodiments of the adjustable iris diaphragm will be described herein.

Referring now to FIG. 1, there is shown a transducer porting assembly 100 in accordance with a first embodiment of the invention. The porting assembly 100 includes a transducer 102 and an adjustable iris diaphragm 104 for aligning with the transducer. The adjustable iris diaphragm 104 is formed of a plurality of selectable aperture sizes 106 which in this first embodiment are formed within a slideable plate 108. The plate 108 is slid such that the selected aperture size 106 is aligned with the transducer 102 to alter the audio response. Depending on the application, the porting assembly 100 may further comprise an acoustic cavity 110 between the transducer 102 and the plate 108 if desired. For microphone applications, the acoustic cavity 110 is preferably formed of a cone or microphone boot.

Figure 2:
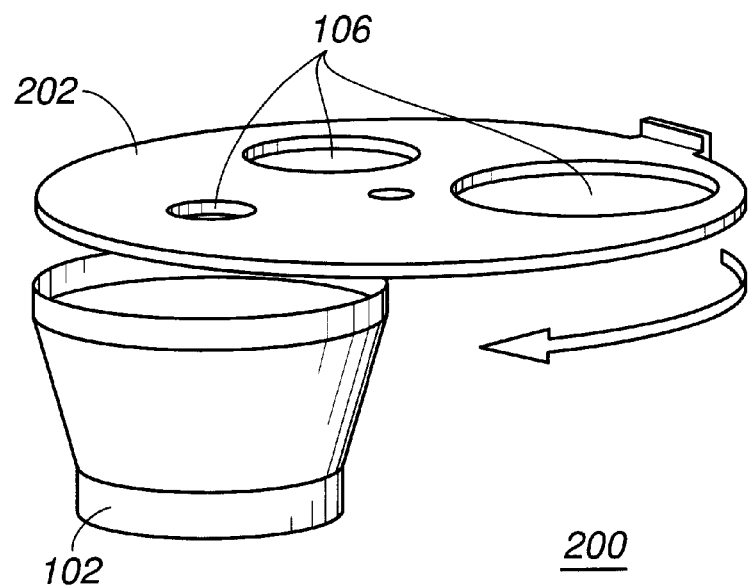
FIG. 2 is a transducer porting assembly in accordance with a second embodiment of the invention.

In a second embodiment of the invention, a transducer porting assembly 200 includes the plurality of selectable aperture sizes 106 formed within a rotary plate 202 as shown in FIG. 2. Depending on available space, the rotary plate 202 allows for an increased selection of aperture sizes 106 with efficient use of area. The rotary plate 202 allows the desired aperture to be dialed into position over the transducer.

Figure 3:
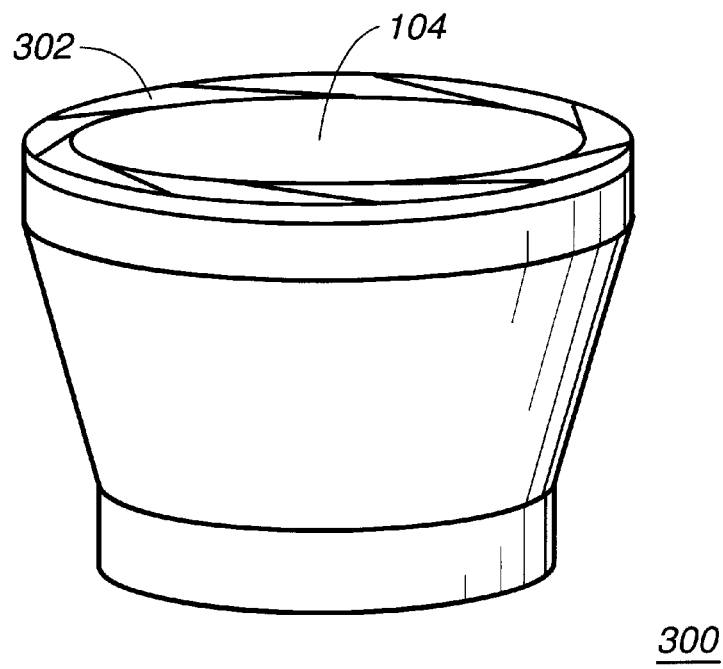
FIG. 3 is a transducer porting assembly in accordance with a third embodiment of the invention.
Figure 4:
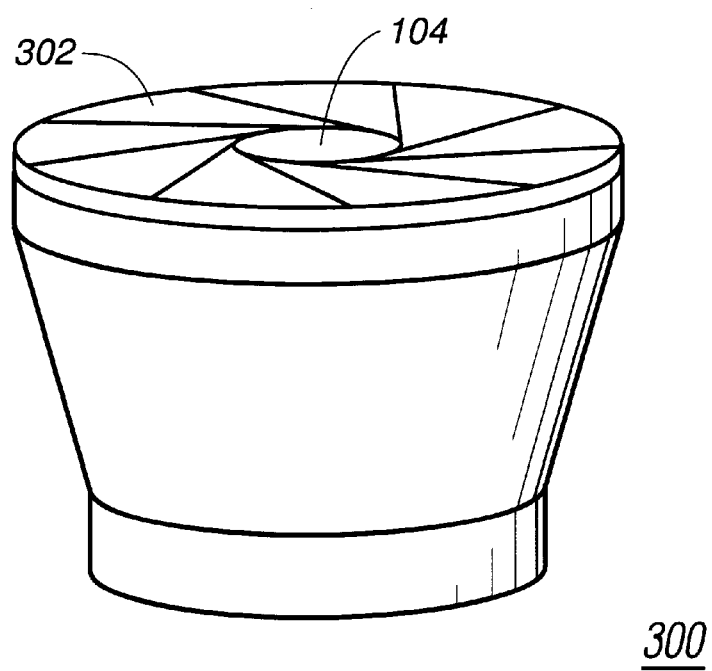
FIG. 4 is the transducer porting assembly of the third embodiment showing a different position of the iris diaphragm blades.

In a yet third embodiment of the invention, a transducer porting assembly 300 includes the adjustable iris diaphragm 104 wherein the plurality of selectable aperture sizes are formed by movable blades 302 coupled to the iris diaphragm as shown in FIGS. 3 and 4. This third embodiment provides the advantages fine tuning as the control of the aperture size can be gradually increased or decreased through smaller increments until a desired audio response is achieved. FIG. 3 depicts a selected position in which the movable blades 302 are substantially open, while FIG. 4 depicts a selected position in which the movable blades are substantially closed leaving only a small opening through which audio can be transferred.

Accordingly, there has been provided a selectable variable aperture for altering the audio response of a transducer. While the aperture configurations shown thus far have generally been represented by circular openings, one skilled in the art appreciates that different shaped openings can be used as well. The selectable variable aperture provides control over the size, shape, and type of opening through which a transducer is exposed to the external environment. Slideable plate, rotary plate, and movable blades are just a few of the embodiments that can be used to create an adjustable iris diaphragm. The use of non-symmetrically shaped apertures, felts, and grills can be added if desired, to provide further variations in the audio response of the transducer. The adjustable iris diaphragm described by the invention can be readily incorporated into communications devices to provide audio shaping through a single plane without the use of multiple stacked devices.

Figure 5:
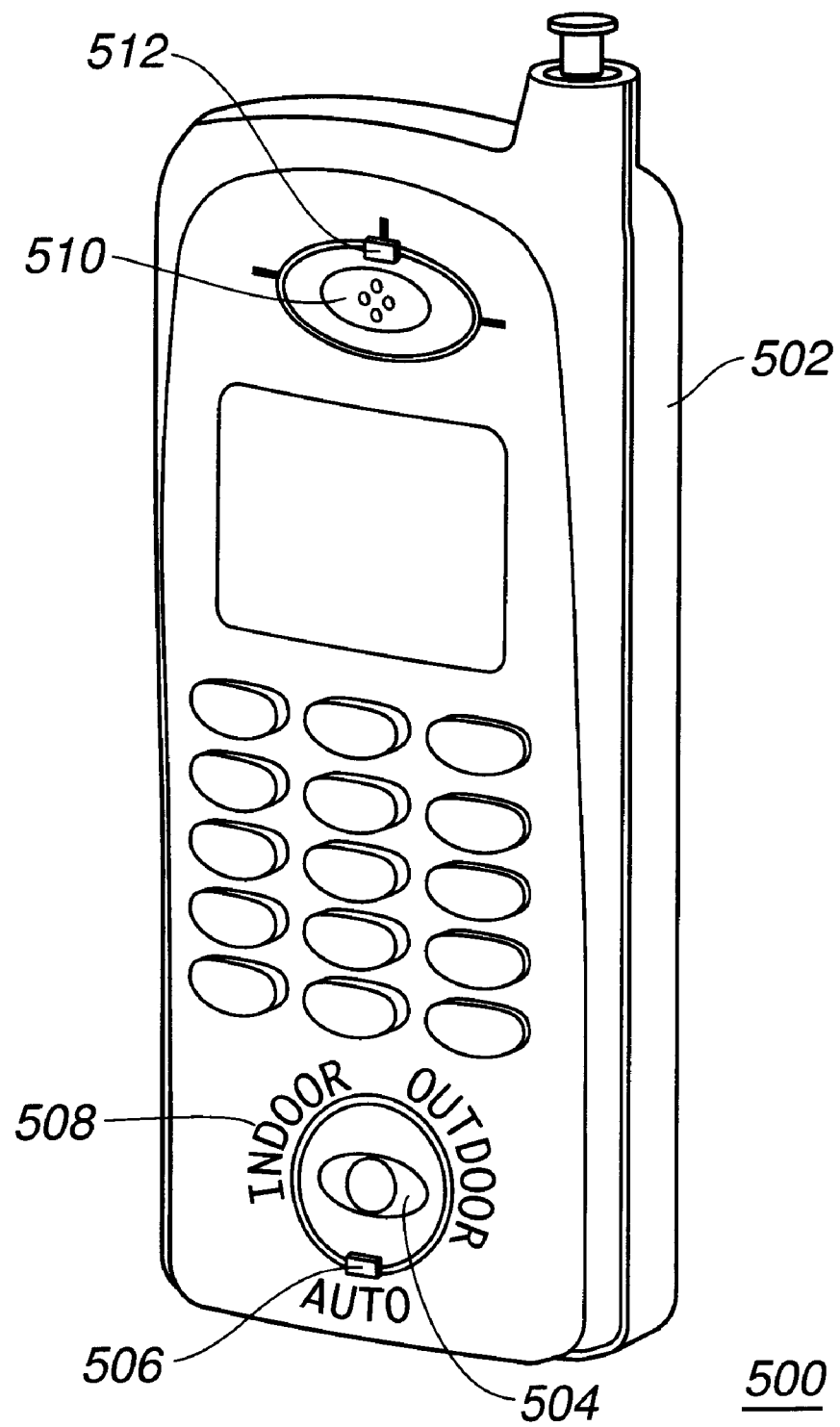
FIG. 5 is a radio incorporating a transducer porting assembly in accordance with the present invention.

Referring now to FIG. 5, there is shown a communications device, such as a portable radio 500, incorporating the transducer mounting assembly in accordance with the present invention. The radio 500 includes a housing 502 within which is mounted a microphone which is aligned with a mouthpiece 504. The adjustable iris diaphragm of the present invention is incorporated as part of the radio housing 502 and aligned between the microphone and mouthpiece 504. A selectable control 506 is included for adjusting the size of the microphone aperture. The housing 502 may include a single opening large enough to accommodate the largest aperature size of the selectable aperature sizes.

Preferably situated about the selectable control 506 are indicia 508 for indicating a plurality of predetermined acoustic environments from which a user can make a selection. For example, the indicia 508 can indicate indoor, outdoor, and automotive selections so that a user can adjust the aperture for the microphone to suit the environment in which the radio 500 is being used. Each indicia position is associated with a predetermined aperture size within the housing 502 to accommodate different acoustic environments. A user can now readily move between different environments, such as factory, office, and home, using the same radio by simply adjusting the aperture size to optimize the audio response for the receiving end.

Alternatively, if the radio 500 is to be used predominately in one known environment, the selectable control feature 506 can be incorporated internally to the product during the manufacturing process and left inaccessible to the user. This alternative embodiment still provides the advantages of a single porting assembly as opposed to having different assembly kits, electronics, or software for each customer. Thus, the concept of a selectable variable aperture provide advantages to both the consumer and the manufacturer.

Though preferably used in conjunction with a microphone, the adjustable iris diagram concept described by the invention has applications for use with a speaker 510. A user can adjust the selectable control 512 to adjust the iris diaphragm to control audio response out of the speaker, such as to simulate a volume control function for the speaker 510.

The adjustable iris diaphragm described by the invention has applications in a wide range of communications products, including analog and digital hand-held radios, as well as remote speaker/microphone accessories to name but a few.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A transducer porting assembly, comprising:
    a housing having an adjustable iris diaphragm formed of a plurality of selectable apertures formed by movable blades coupled to the iris diaphragm; and
    a microphone mounted within the housing and aligned with the adjustable iris diaphragm.

2. A transducer porting assembly as described in claim 1, further comprising an acoustic cavity formed between the housing and the microphone.

3. A transducer porting assembly as described in claim 2, wherein the acoustic cavity comprises a cone.

4. A transducer porting assembly as described in claim 2, wherein the acoustic cavity comprises a microphone boot.

5. A transducer porting assembly, comprising:
    a housing; and
    a microphone mounted within the housing, the housing having a selectable variable aperture formed of movable blades for altering the frequency response of the microphone.

6. A transducer porting assembly as described in claim 5, wherein the housing includes indicia to indicate positions of the selectable variable aperture.

7. A transducer porting assembly as described in claim 5, further comprising an acoustic cavity formed between the housing and the microphone.

8. A radio, comprising:
    a radio housing;
    a microphone coupled within the radio housing;
    an adjustable aperture coupled to the radio housing and aligned with the microphone; and
    a selectable control for adjusting the size of the adjustable aperture wherein the user selectable control includes indicia for indicating predetermined acoustic environments associated with the selected aperture size.

9. A radio as described in claim 8, wherein the selectable control is adjusted by a user.

10. A radio as described in claim 8, wherein the selectable control provides an adjustment for a manufacturing environment.

* * * * *